(12) United States Patent
Bieswanger et al.

(10) Patent No.: US 8,032,334 B2
(45) Date of Patent: Oct. 4, 2011

(54) SENSOR SUBSET SELECTION FOR REDUCED BANDWIDTH AND COMPUTATION REQUIREMENTS

(75) Inventors: Andreas Bieswanger, Ehningen (DE); Michael S. Floyd, Austin, TX (US); Andrew J. Geissler, Pflugerville, TX (US); Soraya Ghiasi, Austin, TX (US); Hye-Young McCreary, Liberty Hill, TX (US); Guillermo J. Silva, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 12/342,054

(22) Filed: Dec. 22, 2008

(65) Prior Publication Data
US 2009/0099817 A1  Apr. 16, 2009

Related U.S. Application Data

(63) Continuation of application No. 11/754,468, filed on May 29, 2007, now Pat. No. 7,502,705.

(51) Int. Cl.
*G06F 11/00* (2006.01)
*G06F 19/00* (2006.01)
(52) U.S. Cl. .................................. 702/188; 700/74
(58) Field of Classification Search .................. 702/188
See application file for complete search history.

(56) References Cited

U.S. PATENT DOCUMENTS

| 4,295,128 | A  |   | 10/1981 | Hashemian et al. |         |
|-----------|----|---|---------|------------------|---------|
| 4,688,183 | A  | * | 8/1987  | Carll et al.     | 700/275 |
| 4,937,763 | A  |   | 6/1990  | Mott             |         |
| 5,661,735 | A  |   | 8/1997  | Fischer          |         |
| 5,920,827 | A  |   | 7/1999  | Baer et al.      |         |
| 6,510,403 | B1 | * | 1/2003  | Ghaseminejad     | 702/188 |
| 7,502,705 | B2 | * | 3/2009  | Bieswanger et al.| 702/116 |
| 7,558,687 | B1 | * | 7/2009  | Bode             | 702/83  |
| 7,647,131 | B1 | * | 1/2010  | Sadowski et al.  | 700/108 |
| 2004/0267395 | A1 |  | 12/2004 | Discenzo et al. |         |

(Continued)

FOREIGN PATENT DOCUMENTS

FR  2603403 A1  4/1988

OTHER PUBLICATIONS

Trajcevski et al., Mission-Critical Management of Mobile Sensors (or, How to Guide a Flock of Sensors), Proceedings of the First Workshop on Data Management for Sensor Networks (DMSN 2004) Toronto, Canada, Aug. 30, 2004 http://photon.poly.edu/~hbr/publi/dmsn04/dmsn.04.pdf.

(Continued)

*Primary Examiner* — Jonathan Teixeira Moffat
(74) *Attorney, Agent, or Firm* — Yee & Associates, P.C.; Libby Z. Toub (57) ABSTRACT

A system for identifying a subset of sensors to sample to reduce the frequency of sensor access. The system determines rise times and records values for the sensors in the system. A time criticality of the sensors is determined based on the rise times. The system processes the sensors by first creating sensor subsets based on one or more constraints on the sensors. The system monitors the values of the sensors in a sensor subset and flags a sensor when it makes a determination that, prior to a next scheduled sampling of the sensor subset, the value of a sensor in the monitored sensor subset will exceed a threshold constraint. The system moves those flagged sensors to a second sensor subset which complies with the sensor's constraints.

12 Claims, 5 Drawing Sheets

U.S. PATENT DOCUMENTS

2005/0194960 A1   9/2005   Tayrani
2008/0126533 A1*  5/2008   Klein et al. .................. 709/224

OTHER PUBLICATIONS

Cao et al., "Spatio-temporal Data Reduction with Deterministic Error Bounds", 2003 ACM, DIALM-POMC'03, Sep. 2003, San Diego, California, pp. 33-42.

Kogekar et al., "Constraint-Guided Dynamic Reconfiguration in Sensor Networks", 2004 ACM, IPSN'04, Apr. 2004, Berkeley, California, pp. 379-387.

Savvides et al., "Using Mobile Sensing Nodes for Dynamic Boundary Estimation", Workshop on Applications of Mobile Embedded Systems, held in conjunction with MobiSys 2004, Boston, Massachusetts, Jun. 6, 2004, pp. 1-3.

* cited by examiner

SENSOR SUBSET SELECTION FOR REDUCED BANDWIDTH AND COMPUTATION REQUIREMENTS

This application is a continuation of application Ser. No. 11/754,468, filed May 29, 2007, status allowed.

BACKGROUND OF THE INVENTION

1. Field of the Invention

The present invention relates generally to an improved data processing system, and in particular to a computer implemented method, data processing system, and computer program product for identifying a subset of sensors to sample using timing-based criteria and using the identified time critical sensors to reduce the frequency of sensor access.

2. Description of the Related Art

As computing devices become more complex and run at greater speeds, sensors are increasingly being used to monitor the conditions of the computer components so that catastrophic failure conditions can be avoided. Modern processors contain sensors which provide information about local conditions on the processor or in the system. This local information may be used to monitor the processor or system, and possibly inform actions which will change the state of the processor or system. These local condition sensors may provide temperatures, path timings, or even voltages at particular locations in the processor and its associated circuitry. For example, temperature sensors may be used in association with processors and motherboards in order to determine when temperature levels of the processors exceed a threshold. Once the threshold is exceeded, various cooling devices or techniques may be employed to reduce the temperature to a safe level.

However, monitoring the sensors in the system at all times may be expensive in terms of processing time and may exceed system bandwidth. For instance, some sensors may provide information that is irrelevant at the current operating point of the processor, but are sampled regardless. Sampling of sensors which provide no useful information increases the amount of bandwidth, storage, and processing capability required to support sensor-guided decision making.

SUMMARY OF THE INVENTION

The illustrative embodiments provide a computer implemented method, data processing system, and computer program product for identifying a subset of sensors to sample using timing-based criteria and the identified time critical sensors to reduce the frequency of sensor access. The system determines rise times and records values for the sensors in the system. A time criticality of the sensors is determined based on the rise times. The system processes the sensors by first creating sensor subsets based on one or more constraints on the sensors. The system monitors the values of the sensors in a sensor subset and flags a sensor when it makes a determination that, prior to a next scheduled sampling of the sensor subset, the value of a sensor in the monitored sensor subset will exceed a threshold constraint. The system moves those flagged sensors to a second sensor subset which complies with the sensor's constraints.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
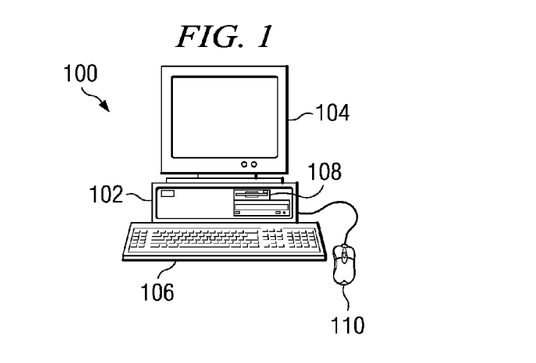
FIG. 1 depicts a pictorial representation of a data processing system in which the illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
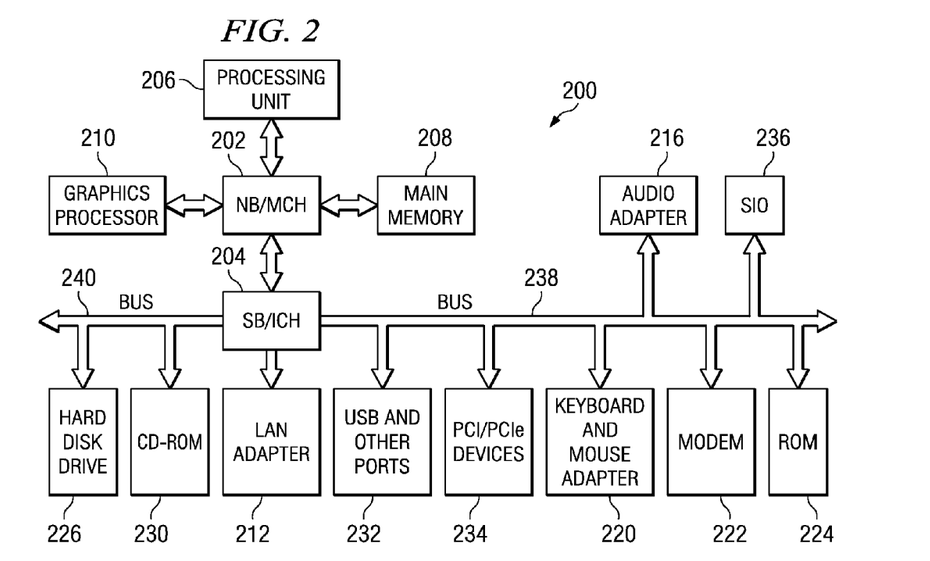
FIG. 2 is a block diagram of a data processing system in which the illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) and other ports 232. PCI/PCIe devices 234 are coupled to south bridge and I/O controller hub 204 through bus 238. Hard disk drive (HDD) 226 and CD-ROM 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system or hypervisor runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide a mechanism for identifying a subset of sensors to sample using timing-based criteria, and using the identified time critical sensors to reduce the frequency of sensor access. The illustrative embodiments provide an advantage over existing sensor sub-setting implementations, since existing sensor sub-setting implementations do not take into account the location and time criticality of any given sensor. Instead, existing sensor sub-setting implementations rely on random selection or signal-to-noise ratios to determine which sensors to sample.

With the illustrative embodiments, time-based criteria are used by a system monitor to identify which sensor subsets should be read and at what time frequency. While the illustrative embodiments allow for reading or sampling all sensors at each time interval, doing so uses extra bandwidth and processing resources which could be given to another source. Thus, the mechanism in the illustrative embodiments first segregates the sensors into subsets based on the time criticality criteria. Time criticality is a constraint on a sensor and reflects how frequently a sensor should be read to ensure safe operation of the system. The characterization of sensors into appropriate time-critical subsets allows a system monitor, such as in the form of a hypervisor, operating system, or out-of-band controller, to reduce the amount of sensor data that needs to be gathered and processed at any given time.

Once the system monitor determines the time criticality of each sensor, the system monitor may then use the subset information to determine the necessary read frequencies of the sensor subsets. The time critical sensor subsets may then be sampled less often according to the read frequencies to reduce the frequency of sensor access and processing. In addition to the time criticality constraint on the sensors, other constraints may also apply when determining the necessary read frequencies. The sensors may already be sub-setted in some manner, such as by the ability to read multiple sensors simultaneously, or by the time it takes to perform a read of a given sensor. For instance, these constraints may include hard-wired sensor groups which must be read simultaneously, the location of sensors on busses, bus speeds, or environmental conditions that lead to a change in time criticality. These constraints are taken into account when the system monitor defines the frequency of reads, since the constraints affect the time criticality of sensor reads. Only the impact of simultaneous reads is considered in the simple examples presented in FIGS. 5 and 6 below.

In one particular embodiment, a static, worst case scenario may be used to determine the time criticality of the sensors. For instance, in a worst case scenario, the ratios, and thus subsets, may be determined by the worst case possible rise time and the desired frequency of reading some known sensor. The rise time is the time it takes a sensor to go from one known temperature to another known temperature. For example, rise time may be measured from 10% above the starting temperature value to 90% of the ending temperature value, and typically captures the region of most rapid change in value. In addition, the initial procedure for identifying the time criticality of sensors may be performed during manufacturing-related tests, made part of the initial boot of a system, or performed at any time during operation by an agent such as a hypervisor or operating system. The initial identification relies on a set of test vectors which mimics the worst case workload or another workload of interest for the sensor type of interest which will be seen on the system. The timing information of the worst case workload or another workload of interest is then recorded.

For example, a system may run a set of vectors mimicking a worst case scientific workload. The temperatures, as reported by digital thermal sensors in the system, are recorded at a known frequency. In the temperature range of interest, the rise times for each digital thermal sensor are recorded. The digital thermal sensors may then be sorted into categories based on rise time. Rise times, taken into consideration when a sensor is already near the thermal limits of the system, give an indication of how often a specific digital thermal sensor must be read to ensure safe operation of the system. Further sub-setting may be performed by characterizing the fall times of each digital thermal sensor as well. The rise times of the various sensors under a worst case workload may be used to determine the ratio between reads of the various sensor subsets. If the sensors in the most critical subset need to be read every other cycle, then the remaining subsets may be read at some multiple of this base frequency.

In another example, the ratio between reads of the various sensors subsets may be determined in a reactive manner based on how hot each sensor subset is running. For instance, the digital thermal sensor subset that is running the hottest may be read at one frequency, while cooler subsets are read at a reduced frequency. The ratio may be determined by the delta between the coldest hot sensor and the hottest hot sensor, and how quickly a sensor can move from one sensor category (or subset) to another.

The membership of the subsets may change dynamically in response to changes in the values measured by the sensors. Similarly, the ratios between the subsets may change dynamically as the temperatures of its members and its actual member list change. These changes are reflective of changes in the time criticality of the sensors.

In another example, the ratio between reads of the various sensor subsets may be determined in a predictive manner. In this example, the system monitor may determine which sensors should be read by a prediction of the future dangers faced by the system. If a number of floating point intensive tasks are allocated, then a digital thermal sensor near the floating point unit may move from a less frequently accessed subset to a more frequently accessed subset. The ratios between subsets may be determined by taking into consideration both the current sensor readings and the predicted future need. The confidence of the prediction may reduce the ratios between the subsets to encapsulate a more conservative approach or to take into account the error in the prediction.

The particular sensors used to monitor the condition of the computer system in the illustrative examples are digital thermal sensors (DTS). However, it should be noted the mechanisms described herein may be applied to other sensor types, such as critical path monitors, out-of-band performance counters, voltage excursion monitors, and the like, as well as applied to sensors in other environments, such as various weather sensors.

Figure 3:
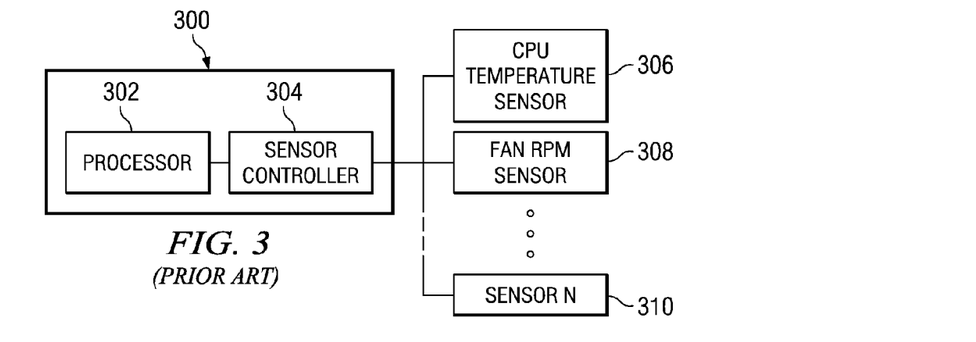
FIG. 3 is an exemplary block diagram of a known sensor control system in accordance with which the illustrative embodiments may be implemented.

FIG. 3 is an exemplary block diagram of a known sensor control system in accordance with which the illustrative embodiments may be implemented. As shown in FIG. 3, sensor control system 300 includes processor 302 and environmental sensor controller 304. Sensor controller 304 is coupled to various sensors 306-310, such as CPU temperature sensor 306, fan RPM sensor 308, among others (sensor N 310).

Processor 302 may be any type of processor provided in a computing device. Processor 302 may be, for example, the central processing unit (CPU) of the computing device, a secondary processor, or a processor dedicated to controlling the functions of environmental control devices, such as processor fans and the like. In one particular embodiment, processor 302 may be a service processor (SP).

Processor 302 is coupled to environmental sensor controller 304 such that data may be transmitted between processor 302 and environmental sensor controller 304. Such coupling may include a system bus or the like.

Environmental sensor controller 304 may be any type of controller that sends and receives information to and from various sensors 306-310, processes the information, and provides processor 302 with reports of the conditions monitored by sensors 306-310. In one particular embodiment, environmental sensor controller 304 may be a System Power Control Network (SPCN) which may monitor thermal, RPM, and other sensors in the computing device.

Environmental sensor controller 304 is coupled to one or more sensors 306-310 via appropriate connections such that data may be transmitted to and from the sensors 306-310. Sensors 306-310 may be any type of sensor used to monitor environmental conditions of the computing device. For example, sensors 306-310 may include temperature sensors, RPM sensors, heat flow sensors, and the like.

At initialization, processor 302 obtains initial measurement values from each of sensors 306-310 via environmental sensor controller 304. Processor 302 then calculates a difference between the initial measurement values and a next warning/critical level. The warning/critical levels may be determined from information stored in a system memory, ROM, or the like (not shown).

Based on the difference between the initial measurement values and the next warning/critical level, processor 302 may send a message to environmental sensor controller 304 instructing environmental sensor controller 304 not to gather any reports until the predicted value of the sensor(s) meets or exceeds a reporting threshold calculated as a function of the difference between the initial measurement values and the next warning/critical level. This function may be any type of function suitable for the particular application in which the illustrative embodiments are implemented. These differences and/or report thresholds may be stored by environmental sensor controller 304 in a memory (not shown) in association with an identifier of sensors 306-310 to which the report threshold corresponds.

When a measured value from a sensor 306-310 is reported to environmental sensor controller 304 which exceeds the report threshold for the sensor 306-310, environmental sensor controller 304 sends a report to processor 302. Based on the reported sensor measurement value, processor 302 may send appropriate control signals to control systems to take corrective action to prevent a critical condition from occurring within the computing device. Thus, for example, once the temperature of a processor within the computing device is within a critical level, processor 302 may issue instructions to a system fan to start, and thereby attempt to reduce the temperature of the processor. Similarly, if the temperature were to keep increasing, processor 302 may take additional corrective action, and may even cause the processor to shut down rather than risk permanent damage to the processor.

Figure 4A:
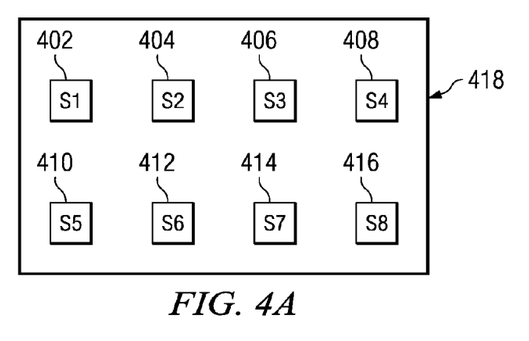
FIGS. 4A and 4B illustrate how placement of sensors impacts time criticality in accordance with the illustrative embodiments.
Figure 4B:
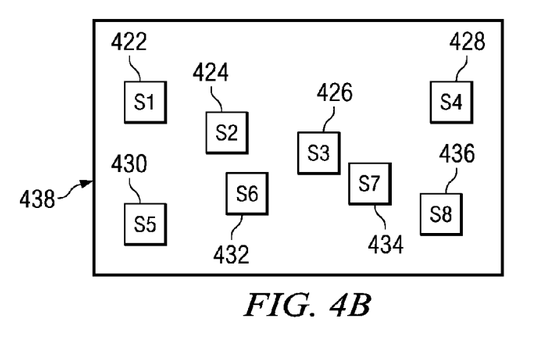

FIGS. 4A and 4B illustrate how placement of sensors within a computer system impacts time criticality in accordance with the illustrative embodiments. FIG. 4A comprises sensors S1-S8 402-416 arranged in computer system 418 in a grid pattern. The grid approach places the sensors in a certain proximity to other sensors to provide uniform coverage of the system. In contrast, FIG. 4B comprises sensors S1-S8 422-436 arranged in computer system 438 based on identified hotspots in the system. A hotspot is a localized area of the system or processor with a significantly higher average temperature. If sensors S2 424, S3 426, S6 432, and S7 434 in FIG. 4B are placed in hotspots, then those sensors are more critical than remaining sensors. These critical sensors S2 424, S3 426, S6 432, and S7 434 reflect the temperature behavior of the region of the chip and do so quickly because the critical sensors are located within a hotspot. In situations where it may not be possible to know in advance where the hotspots are located, the grid approach in FIG. 4A may be used. In FIG. 4A, none of the sensors are located in a hotspot, and the distance between the actual sensor placement and the actual hotspot will impact the time criticality of a sensor, as well as the threshold at which the sensor is considered to indicate the system has entered a dangerous region of operation. The examples presented in FIGS. 5 and 6 below employ the hotspot sensor placement approach to simplify the problems associated with the time criticality impact in the grid approach.

Figure 5:
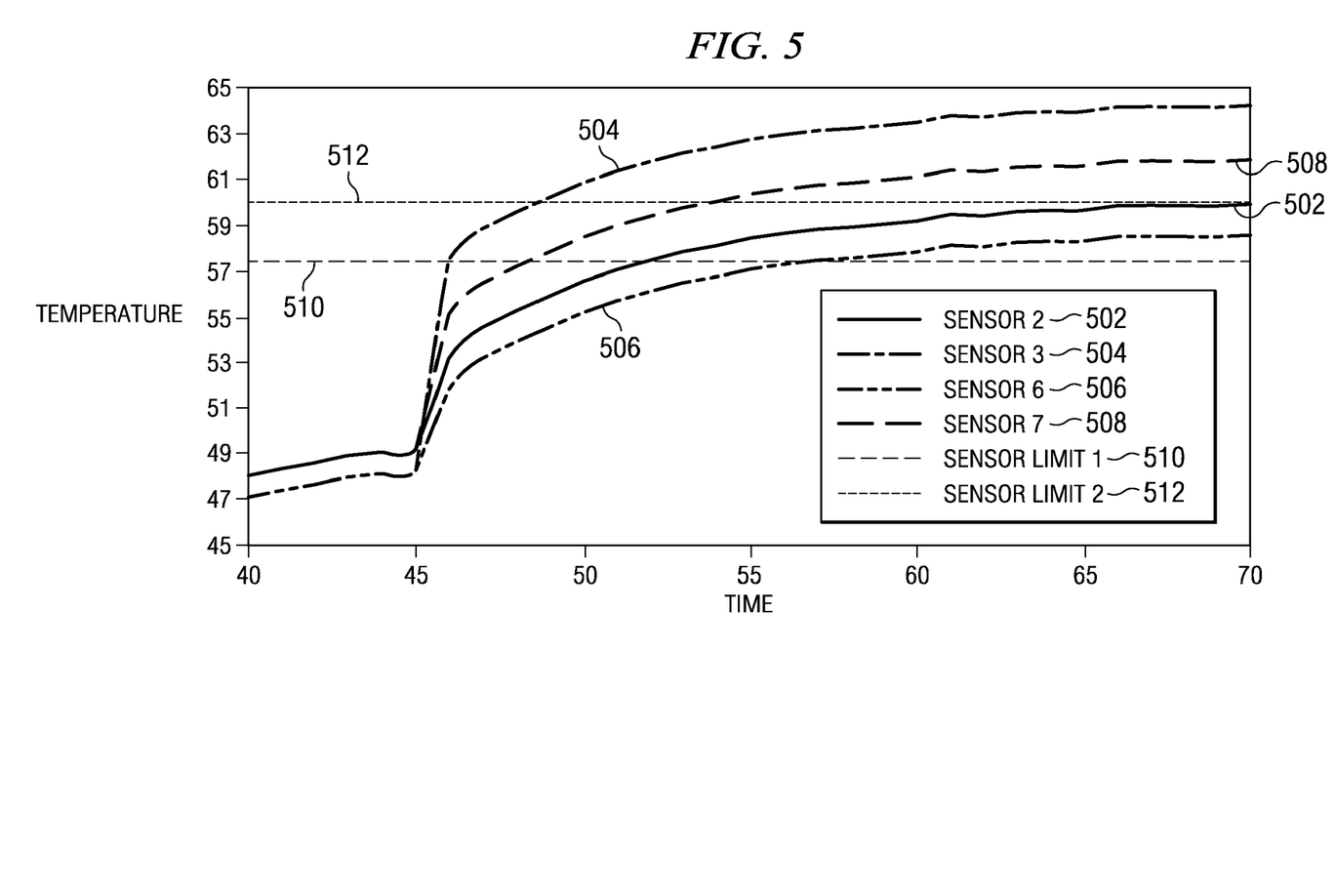
FIG. 5 is a graph illustrating how time criticality information may be derived to determine sensor sub-setting based on sensor rise times using a worst case workload in accordance with the illustrative embodiments.

FIG. 5 is a graph illustrating how time criticality information may be derived to determine sensor sub-setting based on sensor rise times using a worst case workload in accordance with the illustrative embodiments. In particular, FIG. 5 illustrates an example of sub-setting based on the inherent time criticality of thermal sensors. FIG. 5 shows the four hottest sensors S2 502, S3 504, S6 506, and S7 508 in the system (the sensors being comparable to sensors S2 424, S3 426, S6 432, and S7 434 in FIG. 4B) as a temperature stressful workload is applied to the system. A worst case scenario workload is applied in FIG. 5 to identify the rise times of the sensors and derive the appropriate sensor subsets so safe operation is ensured for all workloads. The remaining four sensors in FIG. 4B are ignored in these examples, because their temperatures never exceed the defined sensor limit. This sub-setting is in contrast with typical existing sensor operations which sample every sensor of the same type at the same frequency. For example, based on the sensors shown in FIG. 4A or 4B, existing sensor operations may read all eight sensors every second. This requirement would require 8× (sensor data size) bytes per second rate. If the data needs to be processed as well as read, computational resources are also needed in this example.

When a sensor operation comprising fixed thresholds and variable frequency-based sub-setting is implemented, proper subsets may be derived using a single unique piece of information for each sensor, such as the rate of temperature increase in the region of interest. The graph in FIG. 5 illustrates that two sensor limits, sensor limit 1 510 and sensor limit 2 512, are defined for the system. In each of the following examples, the system reaches an unsafe operating point when the temperature rises about sensor limit 2 512. To guarantee continued safe operation of the system, as defined by no sensor exceeding sensor limit 2 512, sensors S2 502, S3 504, S6 506, and S7 508 should be monitored. It should be noted that a different workload applied to the system may produce different temperature values for each sensor.

As shown in the graph of FIG. 5 by a fixed threshold (e.g., sensor limit 2 512) and variable frequency-based sub-setting implementation, a sample is taken from all four sensors at time 47. The frequency of monitoring is variable. For example, sensor 3 504 needs to be read again at time 48, which is the point at which the sensor temperature reaches sensor limit 2 512. Similarly, sensor 7 508 should be read again before 6 time intervals, sensor 2 502 should be read again before 19 time intervals, and sensor 6 506 never needs to be read because it cannot exceed sensor limit 2 512. However, in practice, sensor 6 506 would be read occasionally as an added safety measure to ensure that a sensor does not overheat under any workload or operating condition. The remaining four sensors S1 422, S4 428, S5 430, and S8 436 in FIG. 4B may also be checked occasionally to ensure that something has not failed and that the initial characterization of the system was correct.

Based on the content of the graph illustrated in FIG. 5, the following reading ratios may be proposed for the sensors:
Sensor 1: 1:64
Sensor 2: 1:18
Sensor 3: 1:1
Sensor 4: 1:64
Sensor 5: 1:64
Sensor 6: 1:64
Sensor 7: 1:6
Sensor 8: 1:64
If the sensors can be read in pairs of two and up to four sensors at a time, the sensors may be broken into the following fixed subsets:
{3,7}, read every interval
{2,6}, read every $18^{th}$ interval
{1,4,5,8}, read every $64^{th}$ interval
In this manner, the sensors may be read at the following intervals to take into account all constraints:
{3,7}, every interval
{2,6}, intervals 18, 36, 54, . . .
{1,4}, intervals 64, 128 . . .
{5,8}, interval 65, 129 . . .
Thus, the variable frequency-based sub-setting implementation in the illustrative embodiments allow for improving upon the original bandwidth requirements with existing sensor operations which have a maximum value of 8× size of sensor read bytes per second rate and an average value of 8× size of sensor read bytes per second rate. The new requirements using the frequency-based sub-setting implementation in the illustrative embodiments allows for a maximum value of 4× size of sensor read bytes per second rate and an average of 2.15× size of sensor read bytes per second rate.

Figure 6:
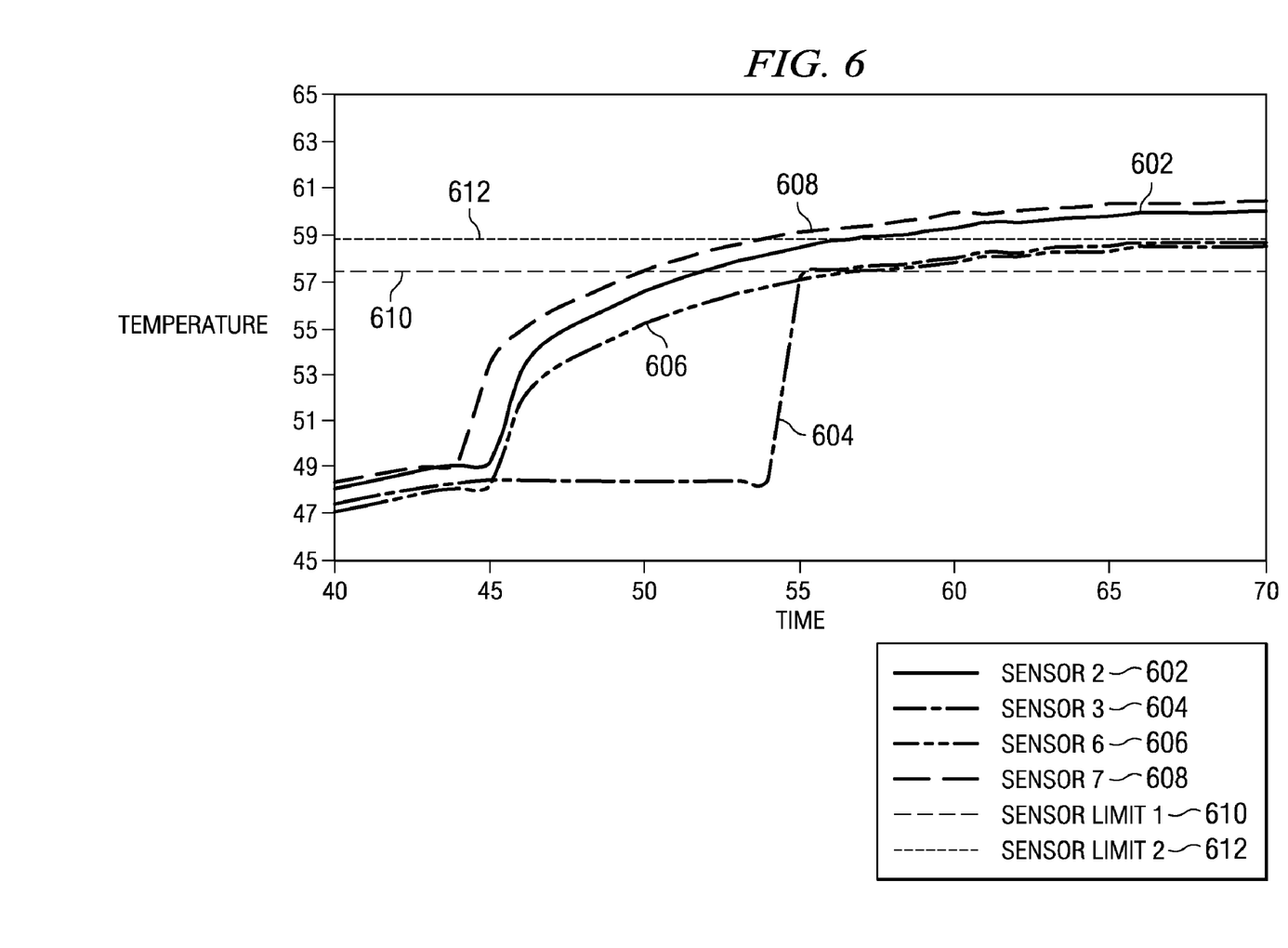
FIG. 6 is a graph illustrating how time criticality information derived in FIG. 5 may be applied to thermal data in accordance with the illustrative embodiments.

FIG. 6 is a graph illustrating how time criticality information derived in FIG. 5 may be applied to thermal data in accordance with the illustrative embodiments. In particular, FIG. 6 illustrates a sensor limit with variable sub-setting whose membership can change over time. In this illustrative example, the worst case data from sensors S2 502, S3 504, S6 506, and S7 508 in FIG. 5 is used to derive time criticality for each sensor at each temperature. This information is then applied to the non-worst case workload data presented in FIG. 6.

The temperature at a given time in FIG. 6 is used to identify the point at which to take the rise time of each sensor S2 602, S3 604, S6 606, and S7 608. FIG. 6 illustrates that two sensor limits, sensor limit 1 610 and sensor limit 2 612, are defined for the system. The system may reach an unsafe operating point when the temperature rises about sensor limit 2 612.

Based on sensor limit 2 612, the system monitor determines that sensor 2 602 should be read again in 19 intervals, sensor 3 604 should be read again in 2 intervals, sensor 7 608 should be read again in 5 intervals, and sensor 6 606 never needs to be read. Thus, while the non-worst case workload in FIG. 6 produces the same sensor subsets as the worst case workload in FIG. 5, the frequency of sampling the sensors differs.

Consequently, at interval 50, the subsets and reading requirements are:

{3,7}, read every $2^{nd}$ interval
{2,6}, read every $18^{th}$ interval
{1,4,5,8}, read every $64^{th}$ interval At time interval 56, the subsets and reading requirements are:

{3,7}, read every interval
{2,6}, read every $18^{th}$ interval
{1,4,5,8}, read every $64^{th}$ interval Although the particular workload examples in FIGS. 5 and 6 only show changes in the frequency of the read intervals, it should be noted that the members of a sensor subset may change as well based on grouping criteria and the time criticality of sensors in the region of current operation.

Figure 7:
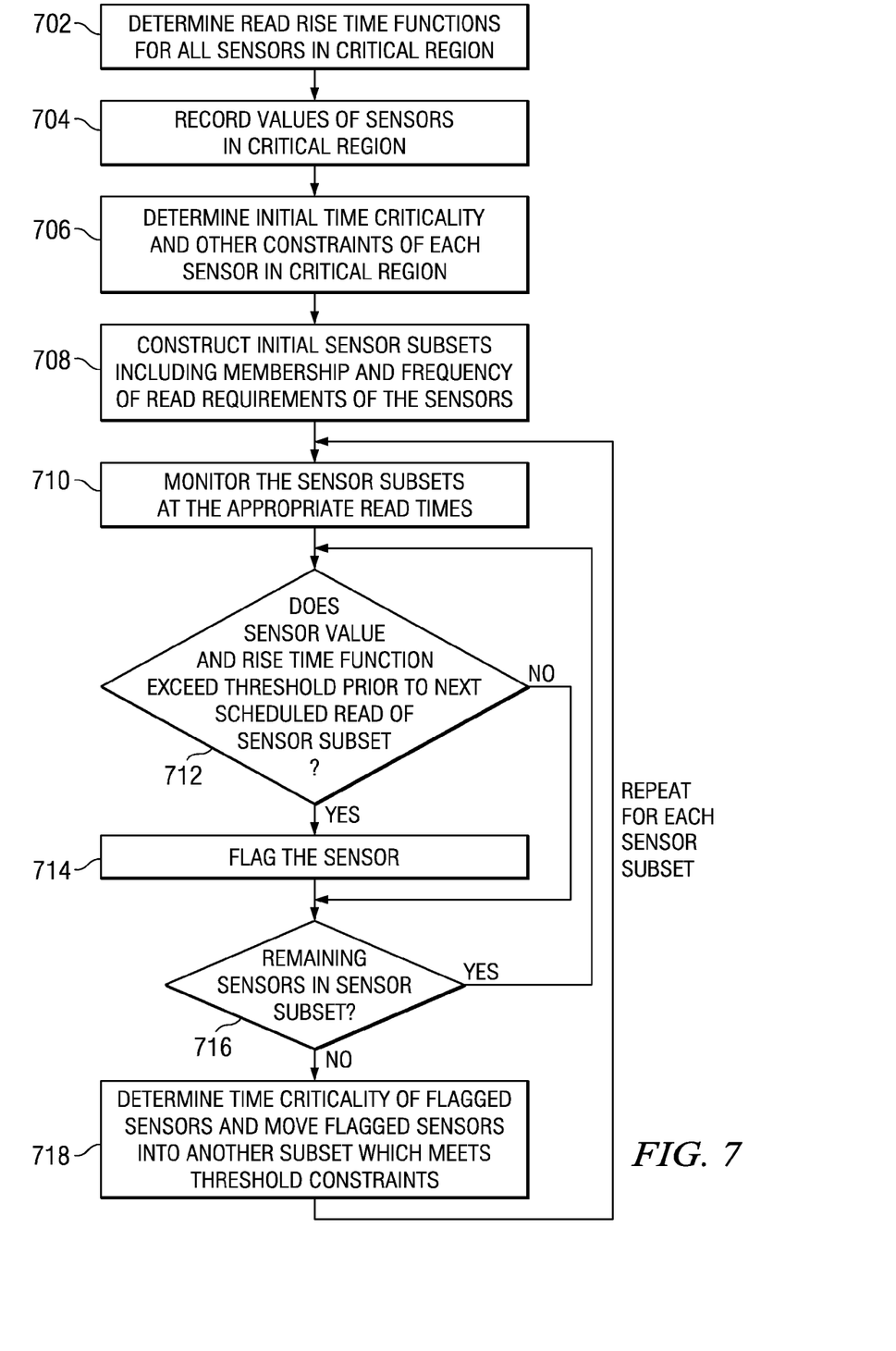
FIG. 7 is a flowchart of a process for dynamically selecting sensor subsets based on time criticality for reduced bandwidth and computation requirements in accordance with the illustrative embodiments.

FIG. 7 is a flowchart illustrating a process for dynamically selecting sensor subsets based on time criticality for reduced bandwidth and computation requirements in accordance with the illustrative embodiments. The process described in FIG. 7 may be implemented in a data processing system, such as data processing system 200 in FIG. 2. The process may be implemented using the same type of sensors, as well as across multiple types of sensors.

The process begins with the system determining the read rise time functions for all sensors in the critical region (step 702). Rise time may be obtained using any suitable form of calibration which detects the time it takes a sensor to go from one value (e.g., temperature) to another value. The rise times provide an indication of how often a specific sensor must be read to ensure safe operation of the system when a sensor is already near an operating threshold. The system then records the values of the sensors in the critical region (step 704). The system then determines the initial time criticality and the other constraints of all sensors in the critical region (step 706). The time criticality of a sensor is a constraint which depends upon either the rise time function or the voltage margin function of the sensor, or a combination of both. The voltage margin function is a function which determines how close to the minimum safe voltage is the sensor, and allows for reading the sensor more frequently during certain events. The other constraints on the sensors may include, but are not limited to, hard-wired sensor groups which must be read simultaneously, the location of sensors on busses, bus speeds, or environmental conditions that lead to a change in time criticality. Based on the initial time criticality and other constraints of each sensor, the system constructs the initial sensor subsets including membership and frequency of the read requirements of the sensors (step 708).

The system then monitors all of the sensor subsets at the appropriate read times (step 710). For example, the system may read/process sensor values in subset A at every read time, and read/process values in subset B at every third read time, etc. When reading a current subset, a determination is made as to whether the value of a sensor in the current subset plus the sensor's rise time function may exceed a threshold of safe operation (i.e., thermal limit) prior to the next scheduled read of the sensor subset (step 712). If the value of the sensor in the currently read subset plus the sensor's rise time function may exceed the threshold before the next scheduled read of the sensor subset ('yes' output of step 712), the system flags the sensor (step 714). The system then determines if there are remaining sensors in the current subset to process (step 716).

Turning back to step 712, if the value of the sensor in the currently read subset plus the sensor's rise time function may not exceed the threshold before the next scheduled read of the sensor subset ('no' output of step 712), the process continues to process the next sensor in the subset if a next sensor is available (step 716).

If there are additional sensors in the subset ('yes' output of step 716), the process loops back to step 712 to process the next sensor in the subset. If there are no additional sensors in the subset ('no' output of step 716), the system then determines the time criticality of the flagged sensors, and moves the sensors to another sensor subset which complies with threshold constraints (step 718). The process then loops back to step 710 to process the next sensor subset.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for dynamically selecting sensor subsets for sampling based on time criticality, the data processing system comprising:
   determining means for determining a rise time function of a time required for a sensor to go from a first predetermined value to a second predetermined value that define a range of interest for each of a plurality of sensors in a system;
   recording means for recording values of the plurality of sensors;
   determining means for determining a time criticality for each sensor in the plurality of sensors based on the determined rise time function of each sensor;
   processing means for processing the plurality of sensors in the system, wherein the processing of the plurality of sensors further comprises:
      creating means for creating sensor subsets within the plurality of sensors in the system based on one or more constraints of the plurality of sensors;
      monitoring means for monitoring the values of sensors in a first sensor subset;
      determining means, responsive to reading the values of the sensors in the first sensor subset, for determining whether a value of a sensor in the first sensor subset plus the determined rise time function of the sensor will exceed a threshold constraint prior to a next scheduled read of the first sensor subset;
      flagging means, responsive to a determination that the value of the sensor in the first sensor subset plus the determined rise time function of the sensor will exceed the threshold constraint prior to the next scheduled read of the first sensor subset, for flagging the sensor; and
      moving means for moving the flagged sensor to a second sensor subset which complies with the constraints on the flagged sensor.

2. A computer program product stored in a non-transitory computer readable storage medium encoded with computer instructions that are executable by a computer to perform a method for dynamically selecting sensor subsets for sampling based on time criticality, the method comprising:
   determining a rise time function of a time required for a sensor to go from a first predetermined value to a second predetermined value that define a range of interest for each of a plurality of sensors in a system;
   recording values of the plurality of sensors;
   determining a time criticality for each sensor in the plurality of sensors based on the determined rise time function of each sensor;
   processing the plurality of sensors in the system, wherein the processing of the plurality of sensors further comprises:
      creating sensor subsets within the plurality of sensors in the system based on one or more constraints of the plurality of sensors;
      monitoring the values of sensors in a first sensor subset;
      responsive to reading the values of the sensors in the first sensor subset, determining whether a value of a sensor in the first sensor subset plus the determined rise time function of the sensor will exceed a threshold constraint prior to a next scheduled read of the first sensor subset;
      responsive to a determination that the value of the sensor in the first sensor subset plus the determined rise time function of the sensor will exceed the threshold constraint prior to the next scheduled read of the first sensor subset, flagging the sensor; and
      moving the flagged sensor to a second sensor subset which complies with the constraints on the flagged sensor.

3. The computer program product of claim 2, further comprising:
   repeating processing of remaining sensors in the first sensor subset in response to a determination that the value of the sensor in the first sensor subset plus the determined rise time function of the sensor will not exceed the threshold constraint prior to the next scheduled read of the first sensor subset.

4. The computer program product of claim 2, wherein moving the flagged sensor to the second sensor subset further comprises:
   changing a next scheduled read of the flagged sensor.

5. The computer program product of claim 2, wherein the determined rise time function provides an indication of how often to sample the sensor to ensure threshold constraints will not be exceeded.

6. The computer program product of claim 2, wherein monitoring the values of the sensors in the first sensor subset includes determining when to read the sensors to reduce frequency of sensor access.

7. The computer program product of claim 2, wherein the one or more constraints of the plurality of sensors include at least one of a location of the plurality of sensors on a bus, a bus speed, or if a sensor is part of a hard-wired sensor group which must be read simultaneously as a group.

8. The computer program product of claim 2, wherein the plurality of sensors in the system comprise a combination of different sensor types.

9. The computer program product of claim 2, wherein the time criticality is the determined rise time function.

10. The computer program product of claim 2, wherein sensors in the plurality of sensors in the system are sorted into different sensor subsets based on the determined rise time function of the time required for each of the plurality of sensors to go from the first predetermined value to the second predetermined value that define the range of interest for each of the plurality of sensors in the system.

11. The computer program product of claim 10, wherein the determined rise time function of each sensor in the plurality of sensors is used to determine a read ratio between reads of the different sensor subsets.

12. The computer program product of claim 11, wherein the different sensor subsets are scheduled to be read based on a multiple of a base read ratio.

* * * * *